United States Patent Office 3,442,581
Patented May 6, 1969

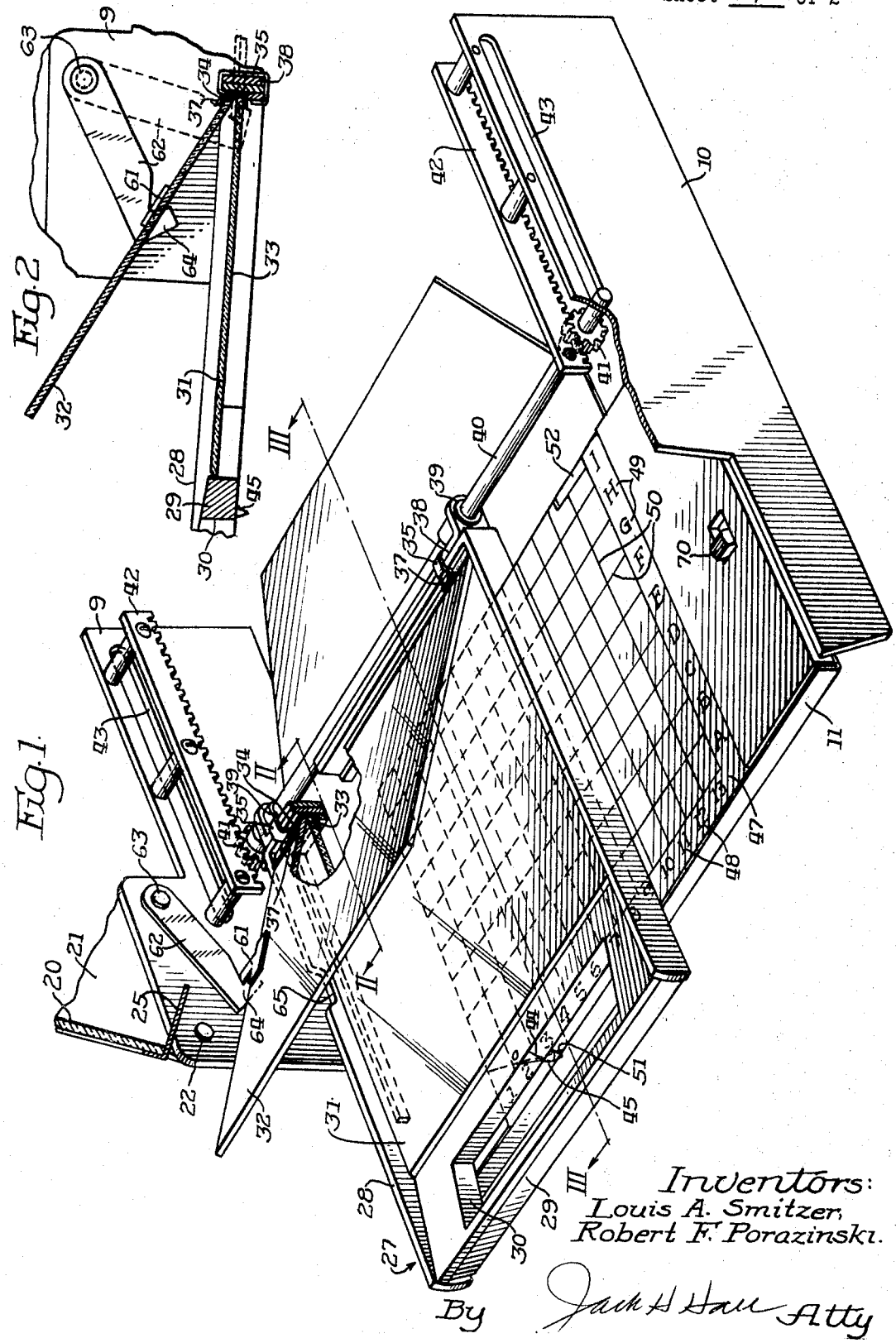

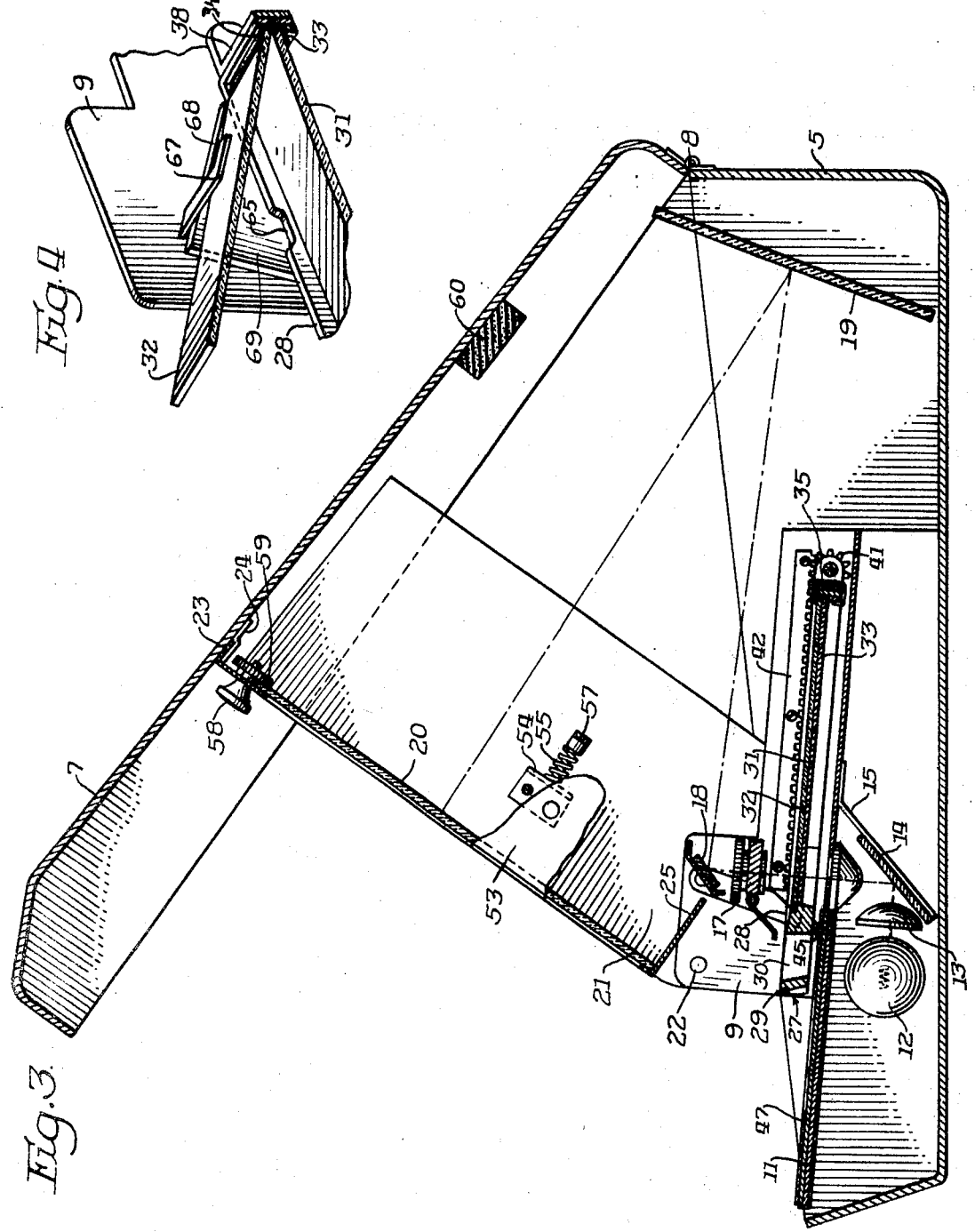

3,442,581
LOW COST MICROFICHE READER
Louis A. Smitzer, Chicago, and Robert F. Porazinski, Norridge, Ill., assignors to Bell & Howell Company, Chicago, Ill., a corporation of Illinois
Filed Nov. 9, 1966, Ser. No. 593,107
Int. Cl. G03b 23/12
U.S. Cl. 353—27                                     8 Claims

ABSTRACT OF THE DISCLOSURE

A flat film viewing apparatus having a microfiche holder frame selectively movable across an optical path from a light source to a viewing screen for projection of the selected images from the film onto the screen. Mounted on the holder frame is a film clamping plate consisting of an upper and a lower transparent plate hinged along one edge. A plate lifting mechanism comprising an arm attached to the upper transparent plate and a hook arm pivotably attached to the housing automatically opens and closes the film clamping plate on the frame for loading and unloading purposes when the holder frame is moved to its extreme forward position. To facilitate locating the respective microfilm image to be projected, and for retaining the film-earying frame in selected positions, an indexing system and a manually releasable detent and socket mechanism is provided, respectively.

---

In viewing apparatus for selectively reading microimages disposed in columns and rows on a flat piece of film, the film must be positioned accurately in the focal plane of an optical system having a light source, enlarging lenses, suitable reflecting mirrors and a viewing screen. Advantageously the film is held in a flat planar relation between two clamping flat transparent plates. In order to load or remove the film from between the plates, they must be separated, and heretofore this has been variously accomplished by means of wedges, spring biased devices and the like. Wedges exert considerable pressure on the edges of the glass tending toward chipping and breaking of plates, and in general, the prior devices have been fairly complex in utilizing springs and other expedients.

Further, various prior devices have involved rather complex and expensive indexing devices for locating the desired image on a multi-image film.

According to the principles of the present invention, it is an important object to provide a simple, compact, low cost microfiche reader in which novel means are provided for facilitating loading and unloading of the film holder, for indexing the frame to locate selected images to be projected on the screen of the reader, and means for retaining the frame against unintentional displacement from predetermined loading and reader transportation positions.

Another object of the invention is to provide novel means for opening and closing the transparent film-clamping plates of a microfilm microfiche reader frame.

A further object of the invention is to provide novel indexing means for a microfiche reader enabling quick location and alignment of selected images of a multi-image film with respect to the focal plane of the optical system of the reader.

Yet another object of the invention is to provide simple manually releasable detent means for retaining the film-carrying frame in selected positions relative to an access opening in the reader housing.

Other objects, features and advantages of the present invention will be readily apparent from the following detailed description of certain preferred embodiments thereof taken in conjunction with the accompanying drawings, in which:

FIGURE 1 is a fragmentary isometric view of a film holder and related mechanism of a microfiche reader;

FIGURE 2 is a fragmentary sectional detail view taken substantially along the line II—II of FIGURE 1;

FIGURE 3 is a longitudinal vertical sectional detail view through a microfiche reader embodying the holder mechanism of FIGURE 1 and taken substantially along the line III—III of FIGURE 1; and FIGURE 4 is an isometric sectional detail view showing a modified film-clamping plate opening arrangement.

In a compact, low cost, lightweight unit, a microfiche reader embodying features of the present invention comprises a housing contained within a carrying case comprising a pan-like bottom part 5 and a complementary inverted generally pan-shaped cover 7. Along their rear edges, the casing bottom 5 and the cover 7 are pivotally connected as by means of a hinge 8.

Within the forward portion of the housing bottom 5 is a supporting frame structure comprising a longitudinally extending left side frame member 9 and a longitudinally extending right side frame member 10 supporting therebetween a raised platform 11 located at the front of the housing body.

Supported under the platform 1 is a light source comprising conventional lamp 12 the light from which passes through a condensing lens 13 to a slanted mirror 14 on a bracket 15 which directs the light upwardly through a focusing lengs system adjustable from the front of the reader by means of an adjusting wheel 17. Above the focusing lens the light beam is reflected by a mirror 18 rearwardly onto a mirror 19 mounted in the rear portion of the housing bottom 5 and from which the enlarged light beam is directed onto the inner face of a translucent viewing screen 20 carried by a supporting frame 21 mounted on suitable pivots 22 on the upper front portions of the frame members 9 and 10 to be swung from a collapsed position downwardly within the housing over the platform 11 into an erected position as shown in FIGURE 3 wherein a latching flange 23 on the frame 21 releasably engages a latching bracket 24 carried by the cover 7. Thereby the viewing screen frame props the cover 7 open. In this open, erected relationship, a front opening is defined between the frame members 9 and 10 at the opposite sides, the platform 11 at the lower side and a downwardly and inwardly extending transverse flange 25 on the front end of the screen frame 21.

For supporting a multi-image flat film, generally referred to in the art as a "microfiche" for selective alignment of the microfiche images in the focal plane of the optical system of the reader, a holder 27 is provided and means for guiding movements of the holder in a plane which intersects that portion of the optical path which comprises the focal plane. To this end, the holder 27 comprises a rectangular open frame 28 having a handle-bar 29 across its front end provided with a hand hole 30. Rearwardly of the handlebar the frame provides an open area over which is mounted a transparent film clamp comprising a lower plate 31 and an upper plate 32 which may comprise glass or a suitable rigid plastic. Support for the clamp assembly within the frame 28 affording maximum exposure area is provided by a narrow bed ledge 33 on which the lower plate 31 rests. Suitable flexible hinge means 34 connects the rear edges of the plates 31 and 32. Unintentional upward displacement of the hinged rear edges of the plates is prevented by means such as a pair of clips 35 attached to the rear bar structure of the frame 28 and having overlying upwardly and forwardly extending respective retainer flanges 37 which permit a full range of forwardly opening gaping of the clamping plates about their hinge for loading and unloading of a microfiche.

For guiding the holder 27 through a full range of front to rear and transverse movements over the platform 11 and through the optical plane of the optical system of the machine, a bracket 38 is mounted on the rear bar of the frame and has respective bearings 39 generally aligned with the sides of the frame and slidably engaging a shaft 40 for sliding movement therealong for transverse guiding of the frame in square alignment with respect to a front to rear path of movement afforded by pinions 41 carried by the shaft engaging respective racks 42 on the side bars 9 and 10 and with the end portions of the shaft slidably guided in respective longitudinal guide slots 43 in the side frame bars 9 and 10. Through this arrangement, the holder 27 is movable from a fully projected position over the platform 11 into a fully retracted position within the front housing opening and throughout a range of side-to-side movement which will enable each of a large number of filmed images contained in longitudinal and lateral row alignment to be projected by movement of the selected images into the focal plane of the optical system.

In order to facilitate locating the respective microfilm images to be projected, indexing means are provided on the holder 27 and on the platform 11. To this end, there is provided on the inner side of the surface of the handle 29 defining the hand holes 30 an indexing pointer 44 which is aligned with a depending supporting finger 45 on the underside of the handle which supportingly rides on the upper surface of a supporting panel 47 on the platform 11 and which is provided with transversely disposed front margin indicia 48 identifying longitudinal rows of microfilm frames on a corresponding microfiche, and has along at least one side, herein the right side, indicia 49 identifying transverse rows of the microfilm frames on the microfiche. Through this arrangement, by registering the indexing pointer 44 and the supporting finger 45 with any selected frame 50 in a grid on the panel 47 identified by the indicia 48 and 49, the corresponding microfilm frame on the microfiche will be registered within the focal plane of the optical system for projection onto the screen 20.

In addition to its frame supporting function, the finger 45 serves as a detent for retaining the frame 27 in certain predetermined positions, namely, a forwardly projected loading position and the rearwardly extended retained position for transportation of the reader. To this end, the panel 47 has in its front lefthand corner a socket 51 within which the detent 45 is received gravitationally for retaining the holder 27 in its forward loading position and more particularly against unintentional rearward or sideward displacement while a microfiche is manipulated into its loaded position between the clamping plates 31 and 32 or removed therefrom. In its rear margin, the index panel 47 has a second detent-receiving socket 52, in this instance disposed in the rear right corner portion thereof to receive the detent 45 gravitationally in a rearmost, retracted position of the holder 27 for retaining the holder against displacement from a transporting position, that is, to enable transportation of the reader as a traveling case unit without shifting of the holder on its otherwise relatively freely movable guide structure. From either of the gravitationally latched positions, the holder 27 can be easily released manually by simply lifting the front of the holder by means of the handle 29 to swing it upwardly and release the detent 45 from the respective socket.

For additional assurance against displacement of the holder 27 from its transportation latched position, the screen-supporting frame 21 and the cover 7 are provided with means cooperating to hold the holder 27 against displacement away from the platform 11 in the closed condition of the cover 7. Accordingly, the screen frame 21 has on its right hand side a flange 53 carrying on its inner face a bracket 54 on which is mounted a downwardly projecting compression spring 55 carrying on its lower end a pressure pad 57 which, in the collapsed position of the screen frame presses yieldably against the adjacent side of the holder frame 28. On its upper free margin, the screen frame has an upwardly extending knob 58 of multiple function comprising a convenient handle for manipulating the screen frame, as a threaded manually releasable screen retainer in association with a threaded retainer disc 59, and as an abutment cooperating with the cover 7. For positive hold-down pressure of the cover 7 against the abutment knob 58, the inner face of the cover is desirably provided with a yieldable pressure pad 60 aligned to press down on the knob 58 in the closed condition of the cover, and desirably comprising a piece of felt, sponge rubber, or the like.

Novel means are provided to facilitate loading and unloading of the holder 27. In a simple and efficient manner this is accomplished by providing the upper clamping plate 32 and the housing, and more particularly the frame structure within the housing supporting the holder, with cooperating means operable in the forwardly projected loading position of the holder 27 automatically to separate the clamping plates by raising the plate 32 into a forwardly opening agape, receiving throat relationship as shown in FIGURE 1. In a desirable form, the plate opening means comprises an arm 61 affixed to the lefthand margin of the plate 32 and automatically engageable and releasable by lifting means carried by the adjacent inner face of the side frame bar 9. In one simple and efficient form the lifting means comprise a lifting arm 62 pendantly pivoted by its upper end portion on a pivot 63 and having on its lower end portion a rearwardly opening engagement hook 64 positioned in the downwardly hanging position of the arm 62 to receive the plate arm 61 automatically as in incident to pulling the holder 27 forwardly from a rearward position while the frame is in its left-most orientation relative to its guiding structure. Thus, in the fully laminar closed relation of the clamping plates 31 and 32, the plate arm 61 projects freely outwardly through a clearance notch 65 in the left side frame bar of the holder frame 28 so that it is in alignment with the hook 64 when the holder 27 is maneuvered forwardly toward the loading position. In the continuing forward movement of the holder the arm 61 is automatically engaged within the hook 64 and the plate thereby lifted as the holder is moved forwardly beyond the point of arm and hook interengagement. When the holder 27 has been moved to its forward limit as determined by the front ends of the guide slots 43, the plate 32 is swung to its highest, open position affording a convenient, wide open throat for manipulation of a microfiche out of and into the clamp. At the same time, the holder 27 is gravitationally latched in the loading position by engagement of the detent 45 in the retaining socket 51. After the holder 27 has been loaded, simple raising release thereof from its latched position and rearward movement effects quick and gentle release of the plate 32 to return to its clamping relation to the lower plate 31. Even if the holder 27 is immediately moved rightwardly instead of rearwardly, there is no danger of breakage of the clamping plates 31 and 32, where they are of glass, since the plate 32 returns flatwise toward the plate 31 and where a microfiche is in loaded position between the plates it serves as a cushion. The free swinging pivoted mounting of the hook arm 62 assures a smooth functioning of the plate lifting mechanism both during the lifting action and during the return swinging action, the opposite limits of which are shown in respectively FIGURES 1 and 3, and in the full outline and dash outline positions, respectively, of FIGURE 2.

In a modified arrangement, as shown in FIGURE 4, the automatic clamp opening mechanism comprises a rigid laterally extending arm 67 on the upper clamping plate 32 substantially like the arm 61, and serves as a follower engageable with a rearwardly and downwardly sloping cam edge 68 on a cam member 69 carried fixedly by the adjacent inner side of the frame member 9. As the holder 27 is moved forwardly from a rear lefthand position, the arm 67 slides up the incline of the cam 68, whereby the upper plate 32 is swung into its open position. Rearward or rightward movement of the holder 27 releases the clamp opening mechanism and the plate 32 returns to its clamping position.

From the foregoing it will be apparent that by the present invention there has been provided a compact, simple and economical, efficient microfiche reader which in the collapsed position of the screen-holder 21 and closed position of the cover 7 can be readily stored and transported as a carrying case. Preparation of the unit for viewing is simply effected by swinging the cover 7 open, swinging the screen frame 21 upwardly and forwardly by manipulation of the knob 58, and latching the screen frame and cover in operating position, then by connecting the electric lamp 12 to a suitable source of power as by means of an electrical cord (not shown) the unit is ready for operation. Control of the lamp 12 is conveniently through a switch operated by a knob or lever 70 (FIG. 1) at a convenient location within the housing as on the platform 11. The holder 27 is then readily manipulated by engagement of its handle 29 extending forwardly through the front opening in the housing structure and manipulating it from its transporting position into the loading position. After loading, any microfilm image on the microfiche in the holder can be readily found by manipulating the holder over the platform and by the aid of the indexing means including the pointer 44 and the indicia on the underlying platform panel 47.

It will be understood that variations and modifications may be effected without departing from the spirit and scope of the novel concepts of this invention.

We claim as our invention:

1. In a microfiche reader including a housing having structure providing an access opening, a viewing screen mounted on the housing, and a light source and an optical system within the housing defining an optical plane and projecting onto said screen:
    a microfiche holder comprising a frame operable through said opening and movable in a scanning plane aligned with said optical plane;
    a pair of transparent microfiche clamping plates carried by said frame and hingedly related along inner edges thereof for hinged swinging opening and closing movements between an outwardly opening agape relation and a closed clamping relation upon a microfiche therebetween and of which respective images may be selectively projected on said screen by moving the images into the optical plane by movements of the frame in said scanning plane;
    arm means on one of said plates and a hook arm pivotably attached to the housing and located to be automatically engaged by the arm on said plate by manipulation of the frame to move outwardly from a position inwardly relative to said opening into said loading position, said engagement thereby swinging said plates into an outwardly opening agape relation.

2. A microfiche reader as defined in claim 1 wherein said housing includes a side frame member located opposite one side of the holder frame; and wherein said hook arm is attached to said side frame member; said arm means extending substantially laterally from said plate toward said hook arm for engagement therewith only upon manipulation of said holder frame so that said one side is closely adjacent said housing frame member.

3. A reader as defined in claim 1 including releasable detent and socket means on the frame and the housing for retaining the frame in said loading position, releasable detent and socket means on said frame and said housing for retaining the frame in a transportation position, and indexing means on said frame and said housing to facilitate selectively locating respective images to be projected on said screen by said movements of the frame in said scanning plane.

4. A reader as defined in claim 3, in which said releasable detent means is gravitationally engageable with said socket means in one position of the holder relative to the housing to retain the holder against all movement in the scanning plane until the frame is lifted to release the detent from the socket.

5. In a microfiche reader including a housing having structure providing an access opening, a viewing screen mounted on the housing, and a light source and an optical system within the housing defining an optical plane and projecting onto said screen:
    a microfiche holder comprising a frame operable through said opening and movable in a scanning plane aligned with said optical plane;
    a pair of transparent microfiche clamping plates carried by said frame and hingedly related along inner edges thereof for hinged swinging opening and closing movements between an outwardly opening agape relation and a closed clamping relation upon a microfiche therebetween and of which respective images may be selectively projected on said screen by moving the images into the optical plane by movements of the frame in said scanning plane;
    a transversely extending arm on one of said plates, and a cam located along only one side of said housing, engageable by said arm to swing the plates into said agape relation upon manipulation of the frame toward said one side and outwardly from a position inwardly relative to said opening, into said loading position.

6. In a microfiche reader including a housing having structure providing an access opening, a viewing screen mounted on the housing, and a light source and an optical system within the housing defining an optical plane and projecting onto said screen:
    a microfiche holder comprising a frame operable through said opening and movable in a transverse and longitudinal scanning plane aligned with said optical plane;
    means supporting said frame for movement between a loading position projecting outwardly through said opening and a position inwardly relative to said opening, and aligned with said optical plane for projection of an image on the microfiche onto said screen;
    detent means carried by the frame;
    and means defining a detent-receiving socket for receiving said detent to retain the frame against unintentional displacement in the scanning plane from a predetermined position.

7. A reader as defined in claim 6, wherein said socket is receptive of said detent in a fully inwardly extending position of the frame within the housing to retain the frame against unintentional transverse and longitudinal displacement in the scanning plane during transportation of the reader.

8. A reader as defined in claim 6, wherein said detent-receiving socket is in a position to retain the frame in an extended loading relation to said opening, against transverse and longitudinal movement in said scanning plane, when the detent is engaged in the socket.

References Cited

UNITED STATES PATENTS

| | | | |
|---|---|---|---|
| 1,894,005 | 1/1933 | Rose | 88—24 |
| 2,284,776 | 6/1942 | Stuart | 88—24 |
| 2,634,652 | 4/1953 | Barth | 88—24 |
| 3,234,848 | 2/1966 | Stoothoff | 88—24 |
| 3,320,854 | 5/1967 | Wally | 88—24 |
| 3,352,201 | 11/1967 | Brownscombe | 88—24 |

NORTON ANSHER, *Primary Examiner.*

RICHARD M. SHEER, *Assistant Examiner.*

U.S. Cl. X.R.

353—78